United States Patent [19]

Nishimiya

[11] 4,313,590

[45] Feb. 2, 1982

[54] SOLENOID VALVE FOR CONTROLLING FLOW OF FLUID

[75] Inventor: Torazo Nishimiya, Ibaraki, Japan

[73] Assignee: Hitachi, Ltd., Tokyo, Japan

[21] Appl. No.: 121,686

[22] Filed: Feb. 15, 1980

[30] Foreign Application Priority Data

Feb. 21, 1979 [JP] Japan ................................. 54-18326

[51] Int. Cl.³ ............................................. F16K 31/06
[52] U.S. Cl. ..................................... 251/129; 251/323
[58] Field of Search ................................ 251/129, 323

[56] References Cited

U.S. PATENT DOCUMENTS 2,934,090 4/1960 Kenann et al. ................. 251/129 X
3,732,893 5/1973 Ziesche ........................... 251/129 X
4,074,700 2/1978 Engle .............................. 251/129 X Primary Examiner—Arnold Rosenthal
Attorney, Agent, or Firm—Craig and Antonelli

[57] ABSTRACT

A solenoid valve for controlling a flow of fluid, the valve includes valve body having a path for fluid, a valve seat disposed in the path, a first cylindrical bore and a second cylindrical bore opposite thereto with respect to the valve seat. A valve guide is fitted into the second cylindrical bore and a rod of a valve member is inserted into the valve guide. An annular projection of an electromagnetic driver is inserted into the second cylindrical bore and an output shaft extending through the annular projection is engaged with the valve member.

7 Claims, 2 Drawing Figures

SOLENOID VALVE FOR CONTROLLING FLOW OF FLUID

BACKGROUND OF THE INVENTION

This invention relates to an improvement on a solenoid valve for controlling the flow of fluid. The fluid flow control solenoid valve comprises a valve body having a passage for fluid and a valve seat disposed in the passage; a valve member disposed opposite to the valve seat; and an electromagnetic driver for actuating the valve member. The electromagnetic driver has a yoke, a coil and a movable core and moves the valve member by an output shaft connected with the movable core to control the flow rate of fluid according to the stroke of the valve member.

A solenoid valve of the aforementioned type is described, for example, in U.S. Pat. No. 3,757,263 granted to Saarem, et al, on Sept. 4, 1973.

There are two types of solenoid valve for controlling the flow of fluid. One is a proportional type which controls the stroke of the electromagnetic driver non-stepwise or continuously to provide the fluid flow rate which is proportional to the electric current input to the electromagnetic driver. The other is an on-off type which simply blocks the flow of fluid. In either type, it is necessary to secure the electromagnetic driver to the valve body.

In the solenoid valve of known construction, the electromagnetic driver has a mounting portion projection and this projection is threaded into the valve body. Thus, it is difficult to accurately align the center of the output shaft of the electromagnetic driver with the center of the valve member, with a resultant off-centered load acting upon the moving parts such as the movable core of the electromagnetic driver and the valve member. Although the off-centered load does not noticeably deteriorate the operating characteristic of the on-off type of the solenoid valve, it does have a great adverse effects on the operating characteristic of the proportional type and produces a hysteresis in the flow rate control characteristic.

Furthermore, in the known construction, since the electromagnetic driver is screwed into the valve body, the position of the terminals of the electromagnetic driver is not constant and varies from valve to valve. This makes it troublesome to wire the terminals with external electrical equipment. Especially in the proportional type, it is almost impossible to bring the terminals to a predetermined position for all valves, since the control characteristic is adjusted by giving the electromagnetic driver further reverse turns to change the force of the spring.

SUMMARY OF THE INVENTION

An object of this invention is to provide a solenoid valve for controlling the flow of fluid, in which the output shaft of the electromagnetic driver can readily and accurately be aligned with the valve member. This solenoid valve produces little, off-centered load exerted on the moving parts, and has a flow rate control characteristic with little hysteresis, particularly in the proportional type of solenoid valves.

Another object of this invention is to provide a solenoid valve for controlling the fluid flow, which sets the terminals of the electromagnetic driver at a fixed position.

Still another object of this invention is to provide a proportional type solenoid valve in which a desired initial flow rate value in the flow rate characteristic can be obtained.

This invention is characterized in that the outwardly extending annular member provided to the electromagnetic driver is fitted into the cylindrical bore cut into the valve body. The output shaft connected at one end with the movable core of the electromagnetic driver extends at the other end through the annular member of the driver and engages with the valve member installed within the valve body.

DESCRIPTION OF THE PREFERRED EMBODIMENT

Figure 1:
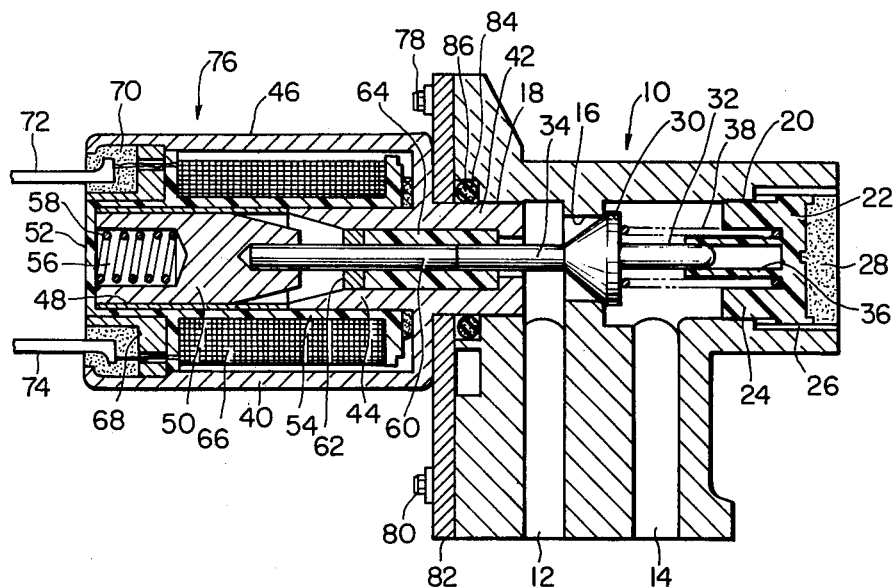
FIG. 1 is a vertical cross-sectional side view of one embodiment of this invention.

Referring to FIG. 1, a valve body generally designated by the reference numeral 10 includes air passages 12, 14, a valve seat 16 provided in the passages, a first cylindrical bore 18 and a second cylindrical bore 20. The first and second cylindrical bores 18, 20 oppose each other with the seat 16 therebetween. The valve body 10 is formed as a single unit body by aluminum die casting. An annular valve guide 22 is made, for example, of nylon resin containing molybdenum disulfide with a small friction coefficient, and is inserted into the bore 20 in a rigid relationship therewith. The valve guide 22 has a portion 24 fitted into the bore 20 and a portion 26 screwed into the bore 20. Adhesives 28 of, for example, epoxy resins are provided for closing the bore 20.

A valve member 30, disposed opposite to the valve seat 16, is provided with axially extending rods 32, 34. The rod 32 is slidably inserted into a cylinder portion 36 formed in the valve guide 22. A spring 38 is disposed between the valve member 30 and the valve guide 22, with a pressing force of the spring 38 being adjustable by turning the valve guide 22 to move the guide 22 axially. Since the adjustment of the spring 38 is unnecessary after it has been assembled, the bore 20 is closed by the adhesives 28 which hardens after a predetermined time interval.

An iron yoke 40 is comprised of an annular member 42, an annular fixed core 44, and a housing member 46. The annular member 42 fits into the bore 18 formed in the valve body 10. The annular fixed core 44 is provided opposite to the annular member 42 and extends in a direction opposite to that of the annular member 42. The housing member 46 encloses the fixed core 44 and extends in parallel therewith.

A brass ring 48 is disposed opposite to the fixed core 44 of the yoke 40, with a movable core 50 being slidably inserted in the ring 48. A bobbin 54 formed of insulating material, such as nylon resin, and having a bottom 52 is fitted around the ring 48 and the fixed core 44. A spring 58 is inserted into a bore 56 cut in the movable core 50. An output shaft 60 is rigidly connected at one end with the movable core 50, and the other end extends through the fixed core 44 and the annular member 42 and engages with the rod 34 of the valve member 30. A brass bearing 62 and a plastic bearing 64 are provided between the output shaft 60 and the fixed core 44 and annular member 42. A cylindrical coil 66 is mounted on the bobbin 54 disposed between the housing member 46 and the fixed core 44. An iron clasp 68 is fitted into the housing member 46 and bonded thereto with a resin 70 so as to hold the bobbin 54 in place on the yoke 40. External terminals 72, 74 are connected to the respective terminals of the coil 66.

To assemble onto the valve body 10 an electromagnetic driver generally designated by the reference numeral 76, consisting of the yoke 40, the cylindrical coil 66 and the movable core 50, the annular member 42 of the yoke 40, is inserted into the bore 18 of the valve body 10 and then a flange 82 is fastened to the valve body 10 by screws 78, 80. Then, an O-ring 86, installed into a channel 84 formed around the periphery of the inlet of the bore 18, is pressed against the outer surface of the annular member 42 to provide a seal. Machining the outer surface of the annular member 42 and the inner surface of the bore 18 with high precision enables the accurate alignment of the axes of the output shaft 60 and the valve member 30. The valve guide 22, which guides the rod 32 of the valve member 30 has the portion 24 fitted into the bore 20 so that the center of the valve member 30 may not deviate from the correct position. Thus, the valve member 30 is not subjected to any off-centered load and this reduces the hysteresis in the flow control characteristic.

Furthermore, since the position of the electromagnetic driver 76 with respect to the valve body 10 is always constant, the positions of the external terminals 72, 74 are also constant thus facilitating the wiring to other electric components.

Figure 2:
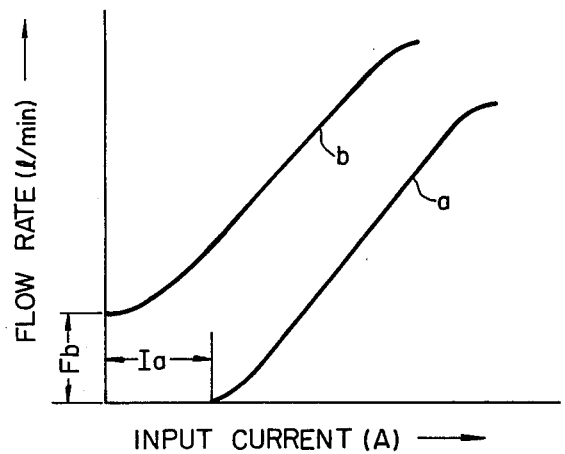
FIG. 2 is a diagram showing the flow rate control characteristic of the solenoid valve of this invention.

The flow rate is obtained with the solenoid valve shown in FIG. 1 is proportional to the input current flowing through the cylindrical coil 66, as shown in FIG. 2. The flow rate control characteristic can be varied, as shown by the curves a and b, by turning the valve guide 22 to move it axially. That is, when the valve guide 22 is shifted toward the right-hand side to make the pressing force of the spring 58 larger than that of the spring 38, the valve member 30 is positioned a predetermined distance apart from the valve seat 16, when no current flows through the cylindrical coil 66, to provide an initial flow rate of Fb (1/min). Conversely, if the valve guide 22 is moved toward the left to make the pressing force of the spring 38 greater than that of the spring 58, the valve member 30 begins to open only when a predetermined value of current Ia flows through the coil 66. Thus, according to this invention, it is possible to freely change the flow rate control characteristic of the solenoid valve simply by moving the valve guide 22 in the axial direction.

I claim:

1. A solenoid valve for controlling a flow of fluid, the solenoid valve comprising:
    a valve body including a path for fluid to be controlled, a valve seat disposed in the path, a first cylindrical bore and a second cylindrical bore, the first cylindrical bore being opposite to the second cylindrical bore with respect to the valve seat;
    an annular valve guide fitted into the second cylindrical bore;
    a valve member disposed oppositely to the valve seat, said valve member having a valve shaft slidably inserted into said annular valve guide;
    a yoke including an annular member fitted into the first cylindrical bore, an annular fixed core opposite to the annular member, and housing member surrounding the annular fixed core and extending in parallel thereto;
    a movable core disposed oppositely to the annular fixed core;
    an output shaft, one end of said output shaft being connected to said movable core and the other end thereof being engaged to said valve member through the annular fixed core and annular member; and
    a cylindrical coil disposed between the annular fixed core and the housing member in coaxial relationship with the annular fixed core; and
    a spring disposed between said valve member and said annular valve guide, the position of said annular valve guide being adjustable in the axial direction thereof.

2. A solenoid valve defined in claim 1, further comprising:
    an O-ring disposed between the periphery of the annular member of said yoke, and said valve body.

3. A solenoid valve defined in claim 2 further comprising a ring disposed opposite the annular fixed core, the movable core being slidably inserted into the ring, a bobbin means fitted around the ring and the annular fixed core for mounting the cylindrical coil, the bobbin means including a bottom portion disposed oppositely to an end face of the movable core, a bore provided in the end face of the movable core, and a spring means accommodated in the bore, the spring means being arranged between a bottom of the bore and the bottom portion of the bobbin means.

4. A solenoid valve defined in claim 3, further comprising bearing means arranged between the output shaft, the annular fixed core, and the annular member, and means for holding the bobbin means in the housing member.

5. A solenoid valve defined in claim 4, wherein the annular valve guide includes a cylindrical portion for slidably accommodating the valve shaft, and wherein means are provided for closing off the second cylindrical bore.

6. A solenoid valve defined in one of claims 1, 2, 3, 4, or 5, wherein the annular valve guide is made of a nylon resin.

7. A solenoid valve defined in claim 6, wherein the nylon resin contains molybdenum disulfide.

* * * * *